United States Patent [19]

Sexton et al.

[11] 4,001,775
[45] Jan. 4, 1977

[54] AUTOMATIC BIT SYNCHRONIZATION METHOD AND APPARATUS FOR A LOGGING-WHILE-DRILLING RECEIVER

[75] Inventors: James H. Sexton, Duncanville; Bobbie J. Patton, Dallas; John W. Harrell, Duncanville, all of Tex.

[73] Assignee: Mobil Oil Corporation, New York, N.Y.

[22] Filed: Sept. 23, 1974

[21] Appl. No.: 508,318

Related U.S. Application Data

[63] Continuation of Ser. No. 403,238, Oct. 3, 1973, abandoned.

[52] U.S. Cl. ............................ 340/18 LD; 325/321; 340/18 P; 178/69.1
[51] Int. Cl.² ...................... G01V 1/40; H04L 7/02
[58] Field of Search ............ 340/18 R, 18 P, 18 LD, 340/18 NC, 146.1 D; 178/69.5 R; 325/58, 321, 349

[56] References Cited

UNITED STATES PATENTS

| | | | |
|---|---|---|---|
| 3,626,298 | 12/1971 | Paine | 178/69.5 R |
| 3,746,800 | 7/1973 | Stuart | 178/69.5 R |
| 3,789,303 | 1/1974 | Hoffman et al. | 178/69.5 R |
| 3,789,355 | 1/1974 | Patton | 340/18 LD |
| 3,909,724 | 9/1975 | Spoth et al. | 178/69.5 R |

*Primary Examiner*—Howard A. Birmiel
*Attorney, Agent, or Firm*—C. A. Huggett; George W. Hager, Jr.

[57] ABSTRACT

In a system for logging while drilling, an uphole receiver demodulates a received acoustic signal to produce a synchronously rectified signal with a polarity representative of the phase state of the acoustic signal. A detector produces a bit value pulse indicative of the phase state of the acoustic signal over a bit time interval. Clock pulses produced by the receiver define the expected boundaries and midpoint of the bit time interval. An integrator integrates the synchronously rectified signal from the midpoint of one bit time interval to the midpoint of the next succeeding bit time interval. Any deviation from zero of the integrator's output over an interval of the acoustic signal including a phase state change is a bit phase error signal. The clock pulses are phase shifted to occur earlier or later in time in accordance with the polarity and magnitude of the bit phase error so as to be synchronized with the true boundaries and midpoint of the bit time interval.

14 Claims, 15 Drawing Figures

LOGGING WHILE DRILLING

MODE DETECTOR

MODE SELECTOR

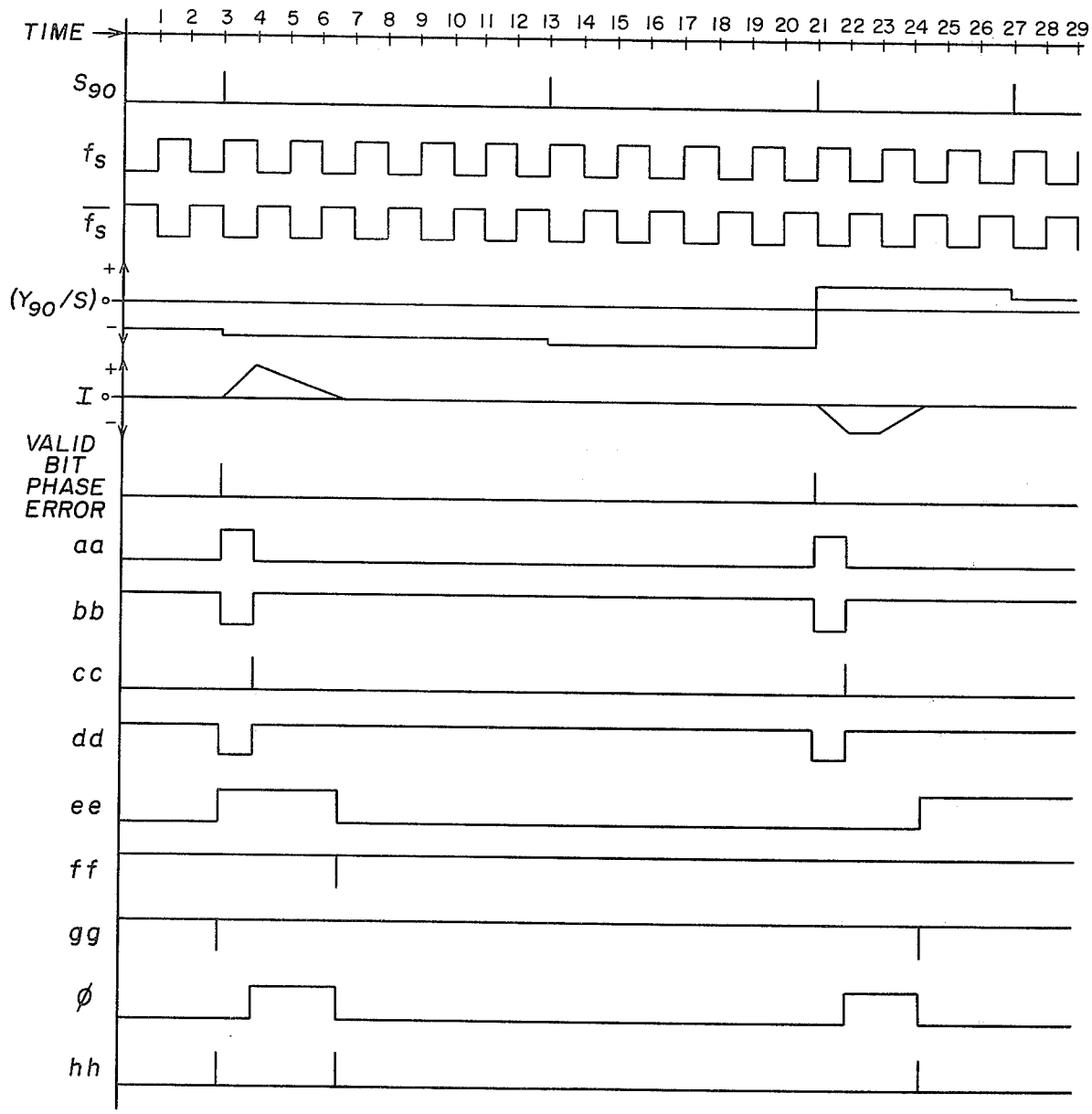
FIG. IIA

AUTOMATIC BIT SYNCHRONIZATION METHOD AND APPARATUS FOR A LOGGING-WHILE-DRILLING RECEIVER

This is a continuation, of application Ser. No. 403,238, filed Oct. 3, 1973.

BACKGROUND OF THE INVENTION

This invention relates generally to logging-while-drilling systems and more particularly to an improved uphole system for receiving data being telemetered to the surface of the earth by means of a continuous acoustic signal passing upward through the drilling fluid.

In one such logging-while-drilling system, the sensing apparatus located within the borehole transmits the logging measurements by means of an insulated electrical conductor extending upward to the surface of the earth through the drill string. In another such logging-while-drilling system, the logging measurements are transmitted uphole by means of an acoustic wave passing upward through the drill string. An example of such a system is disclosed in U.S. Pat. No. 2,810,546 to B. G. Eaton et al. In yet another such system, drilling mud within the borehole is utilized as the transmission medium for the information-bearing acoustic waves. An example of such a system is disclosed in U.S. Pat. No. 3,309,656 to John K. Godbey. In the Godbey system, drilling mud is continuously circulated downward through the drill string and drill bit and upward through the annulus provided by the drill string and the borehole wall, primarily for the purpose of removing cuttings from the borehole. An acoustic transmitter located downhole continuously interrupts the flow of the drilling mud, thereby generating an acoustic signal in the drilling mud. The acoustic wave is modulated with information measured downhole by sensing apparatus, and the modulated acoustic signal is telemetered uphole to the surface of the earth through the drilling mud. At the surface, the modulated acoustic signal is detected and demodulated to provide the desired readout information.

U.S. Pat. No. 3,789,355 of Bobbie J. Patton, issued Jan. 29, 1974, and entitled METHOD OF AND APPARATUS FOR LOGGING WHILE DRILLING, describes a logging-while-drilling system wherein telemetry of information to the surface of the well is accomplished by phase modulation of an acoustic signal. An acoustic signal is generated and transmitted upward through the drilling mud to a remote uphole station. The acoustic signal is modulated between two phase states in response to digitally coded data bits produced as a function of a downhole condition. A change in phase represents a bit of one character and a lack of change in phase represents a bit of a different character. An uphole receiving system produces an output signal representative of the phase state of the received acoustic signal. This is converted to bit clock pulses which define the bit time intervals and a bit value signal representing the generated bits.

SUMMARY OF THE INVENTION

In the logging of a well, a downhole acoustic transmitter sends a modulated acoustic signal upward through a drilling liquid inside a drill string to an uphole receiver. The acoustic signal is modulated between at least two phase states in response to a measured downhole condition with a change in phase representing a bit of one character and a lack of change in phase representing a bit of a different character. Each bit representation is transmitted over a predetermined number of acoustic signal cycles which define a bit time interval. The uphole receiver demodulates the acoustic signal to produce a synchronously rectified signal with a polarity representative of the phase state of the acoustic signal. A bit value pulse is produced having a first state when the phase of the synchronously rectified signal changes at the end of a bit time interval and having a second state when the phase of the synchronously rectified signal does not change at the end of a bit time interval. The bit value pulse therefore indicates the value of the transmitted bit over a bit time interval. First and second clock pulses are produced defining the expected boundaries and the midpoint of the bit time interval, respectively. The synchronously rectified signal is integrated from the midpoint of one bit time interval to the midpoint of the next succeeding bit time interval in response to the second clock pulse to produce a bit phase error having a polarity dependent upon whether the second clock pulse occurs earlier or later in time than the true midpoint of the bit time interval. The first and second clock pulses are then phase shifted to occur earlier or later in time in accordance with the polarity of the bit phase error so as to be synchronized with the true boundaries and the true midpoint of the bit time interval, respectively. The amount of phase shifting required for such synchronization is controlled by the magnitude of the bit phase error.

In another aspect, the bit phase error is ramped to zero at a predetermined rate. The period of time necessary for the bit phase error to be ramped to zero controls the amount of phase shifting required for synchronization.

In a further aspect, the phase shifting of the clock pulses occurs only after a polarity change in the synchronously rectified signal has been detected during the period of integration of the synchronously rectified signal from the midpoint on a bit time interval to the midpoint of the next succeeding bit time interval.

BRIEF DESCRIPTION OF THE DRAWINGS

FIGS. 3 and 11A–11D illustrate the waveforms of the signals appearing at designated points in FIGS. 2 and 4–10.

DESCRIPTION OF THE PREFERRED EMBODIMENT

Figure 1:
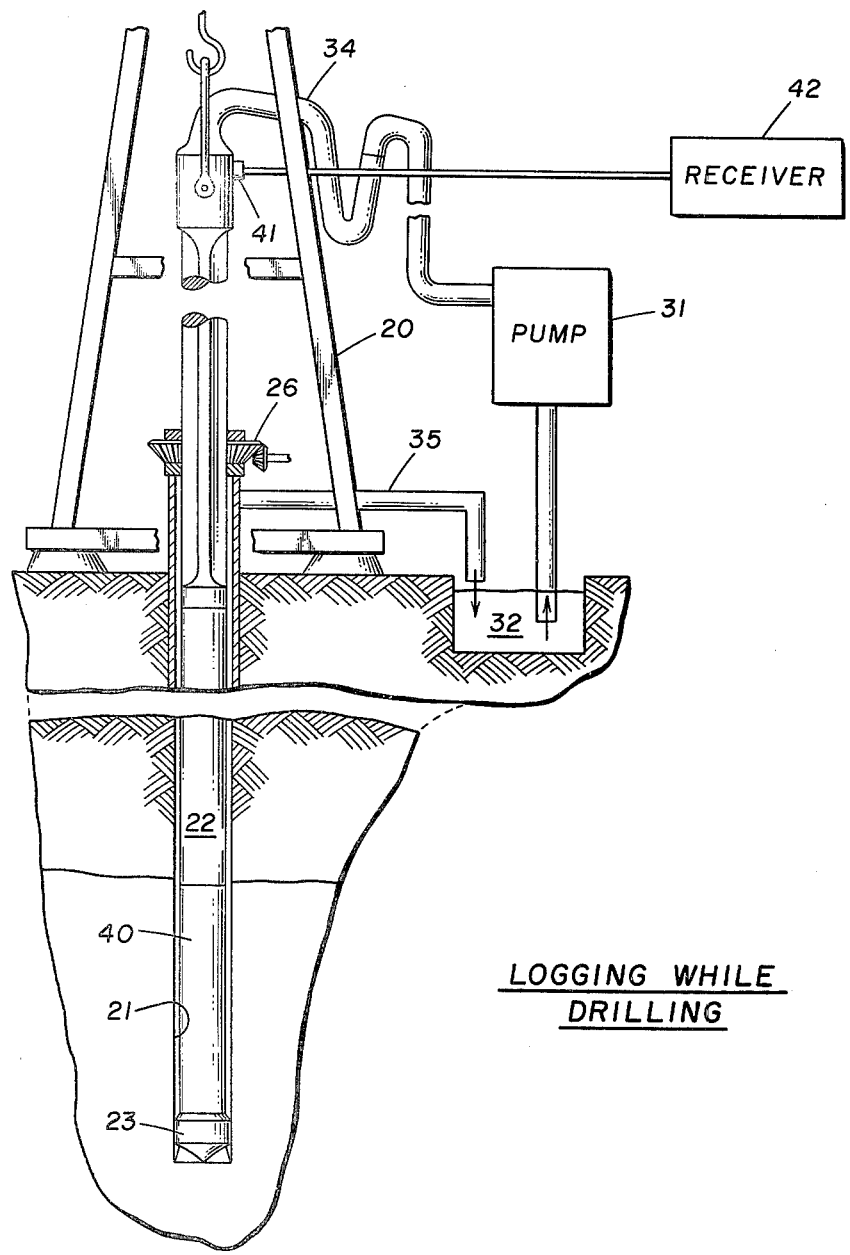
FIG. 1 illustrates a logging-while-drilling system including an uphole receiver.

Logging-While-Drilling System (FIG. 1)

A brief description of a conventional rotary drilling apparatus with which the uphole receiving system of the present invention can be used will be given prior to the detailed description of the uphole receiving system itself. In FIG. 1 there is shown a derrick 20 located over a well 21 being drilled in the earth by rotary drilling. A drill string 22 is suspended within the well 21 and includes a drill bit 23 secured at its lower end. A suitable prime mover (not shown) drives a member 26 to rotate the drill string 22.

A pump 31 transfers drilling mud from a pit 32 in the earth into the drill string 22. The drilling fluid then flows downward into the drill string 22 and exits through openings in the drill bit 23 into the well 21. The drilling fluid then circulates upward from the drill bit 23, carrying formation cuttings through the annulus between the drill string 22 and the well 21 to the surface of the earth. A pipe 35 returns the drilling mud from the well 21 to the pit 32.

Located within the drill string 21 near the drill bit is a downhole logging tool 40 which includes one or more transducers for measuring downhole conditions and an acoustic transmitter which produces an acoustic signal in the drilling mud representative of the downhole conditions. This acoustic signal is telemetered uphole through the drilling mud where it is received by one or more transducers 41. The signals from transducers 41 are applied to a receiver 42 which provides output signals representative of the measured downhole conditions.

Figure 2:
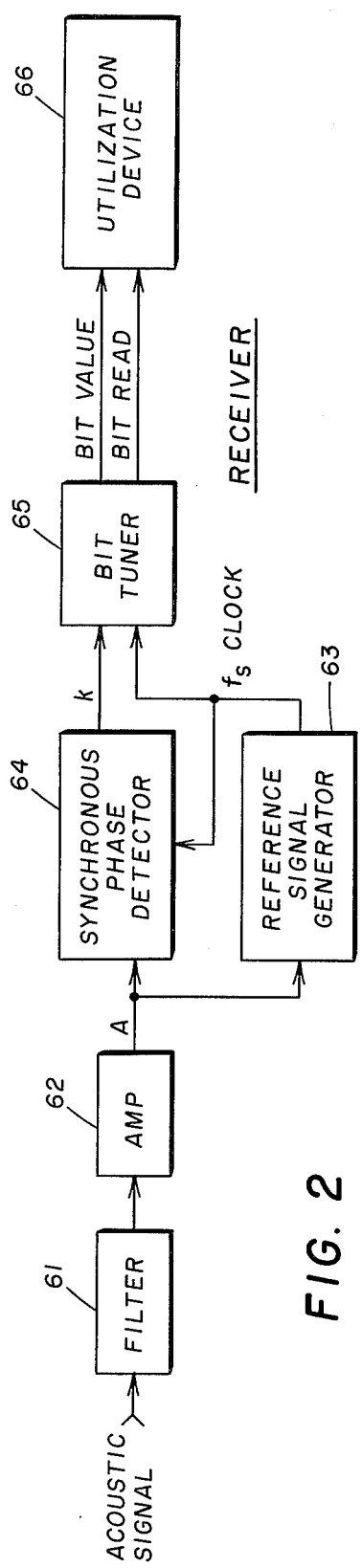
FIGS. 2 and 4 are block diagrams illustrating the uphole receiver of FIG. 1.

Receiver (FIG. 2)

The uphole receiver demodulates the acoustic signal generated downhole and encoded uphole through the drilling mud. This acoustic signal may be telemetered by either analog or digital methods. With binary digital encoding, only two values are transmitted and received rather than the infinite number of values required of analog telemetry. U.S. Pat. No. 3,789,355 entitled METHOD OF AND APPARATUS FOR LOGGING WHILE DRILLING, issued Jan. 29, 1974, by Bobbie J. Patton, describes such a digitally encoded borehole telemetry system. In such system, only one frequency is transmitted and its phase angle is shifted 180° to distinguish between the binary levels "0" and "1". This type of pulse modulation of the acoustic signal is commonly referred to as phase shift keying.

A particularly suitable uphole receiver which may be utilized with a phase shift keyed borehole telemetry system is illustrated and described in detail in copending U.S. patent application Ser. No. 341,014, filed Mar. 14, 1973, of James H. Sexton and Bobbie J. Patton, entitled UPHOLE RECEIVER FOR LOGGING-WHILE-DRILLING SYSTEM, which is incorporated herein by reference. As illustrated in FIG. 2, the receiver of such United States copending patent application Ser. No. 341,014 includes filter 61, amplifier 62, synchronous phase detector 64, reference signal generator 63, and bit tuner 65. It is the specific feature of the present invention to provide a new and improved bit tuner for the receiver. However, before describing such a new and improved bit tuner, a brief description of the over-all receiver is desirable.

The acoustic signal is applied to the bandpass filter 61 which eliminates the harmonics in the acoustic signal. The amplifier 62 produces a signal A, illustrated in FIG. 3, which is representative of the phase and frequency of the received acoustic signal. This output signal A is applied to the reference signal generator 63 which includes a phase lock loop. (Phase lock loops are described in PHASE LOCK TECHNIQUES by Floyd M. Gardner, John Wiley and Sons, 1966.) Reference signal generator 63 produces a reference clock $f_s$, also illustrated in FIG. 3. The reference clock $f_s$ and the output signal A are applied to the synchronous phase detector 64 which produces a synchronously rectified signal $k$ whose polarity is representative of the phase states of the output signal.

Figure 3:
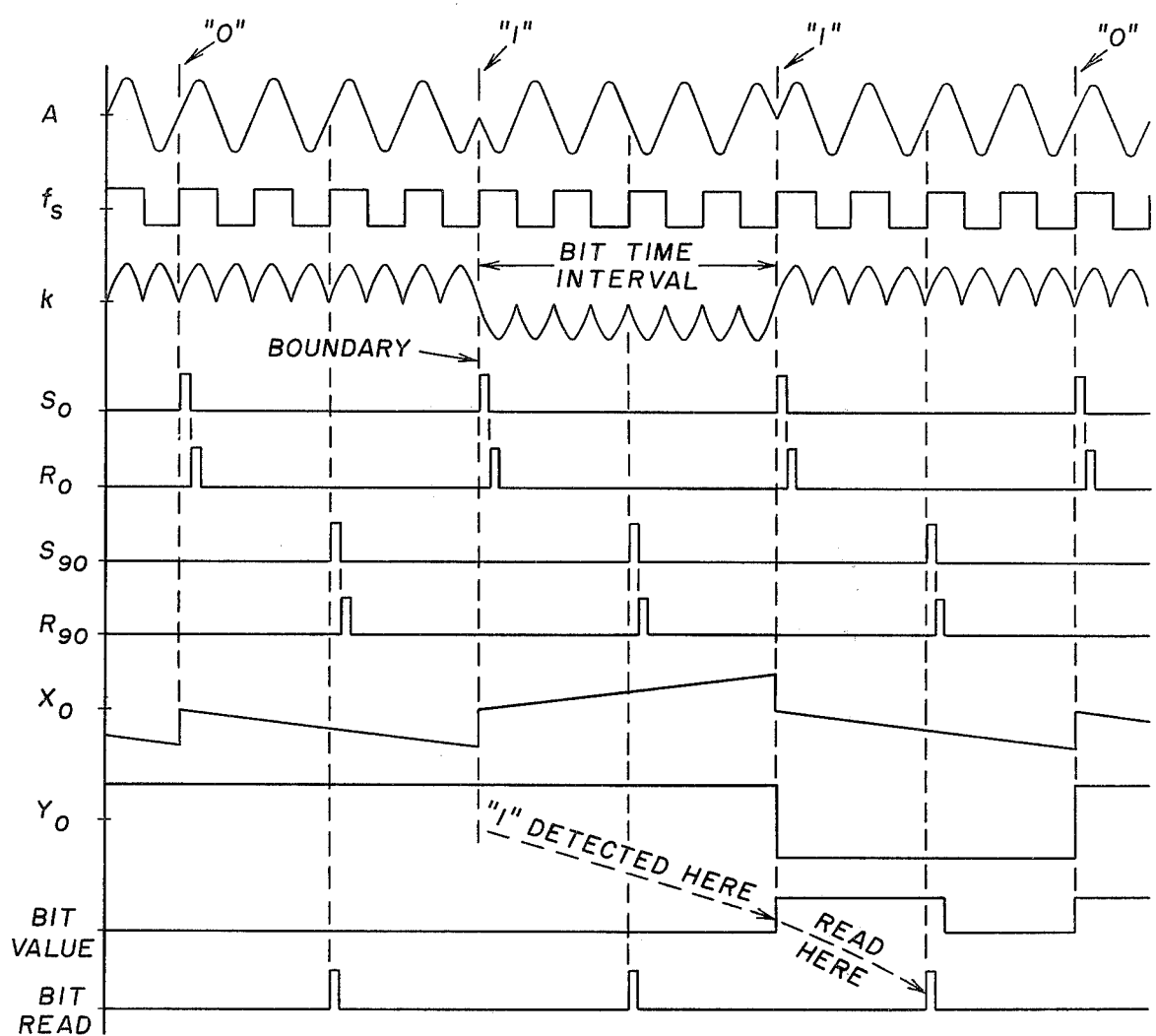

The phase state of the signal $k$ changes sign upon the presence of a "1" bit in the serial data stream but does not change sign upon the presence of a "0" bit in the serial data stream. These data bits, "1" and "0", are coded into the signal $k$ at discrete times, that is, every N cycles of the signal where N is in integer. Each set of N cycles represents one bit time interval. Signal $k$, as illustrated in FIG. 3, represents a transmitted message of 0110. The "1"s are represented by the transitions or changes in polarity of signal $k$.

The synchronously rectified signal $k$ is applied to the bit tuner 65. The bit tuner 65 produces a bit value pulse for each detected "1" bit. The bit value pulses therefore represent the demodulated information transmitted from the downhole location by a phase shift keyed acoustic transmitter. This information is applied to a utilization device 66, such as, for example, a recorder or computer. However, to properly utilize the information, the utilization device must be instructed as to when to read the information provided by the bit value pulses, that is, it must be instructed as to the time at which to look for a "0" bit or a "1" bit. Accordingly, the bit tuner generates bit clock pulses which are also applied to the utilization device and determines when the bit value pulses are to be read.

The bit tuner described in the aforementioned copending patent application Ser. No. 213,061 includes a manually adjustable bit clock generator. Any phase error between the bit clock pulses and the true boundaries of the bit time intervals of the synchronously rectified signal $k$ is corrected by manually adjusting the bit clock generator to time shift the bit clock pulses so that they do accurately define the bit time intervals.

In accordance with the present invention, however, a new and improved bit tuner is provided for carrying out a bit phasing operation which is continuous and automatic, thereby eliminating the manual bit phasing operation described in the aforementioned copending patent application Ser. No. 213,061.

Figure 4:
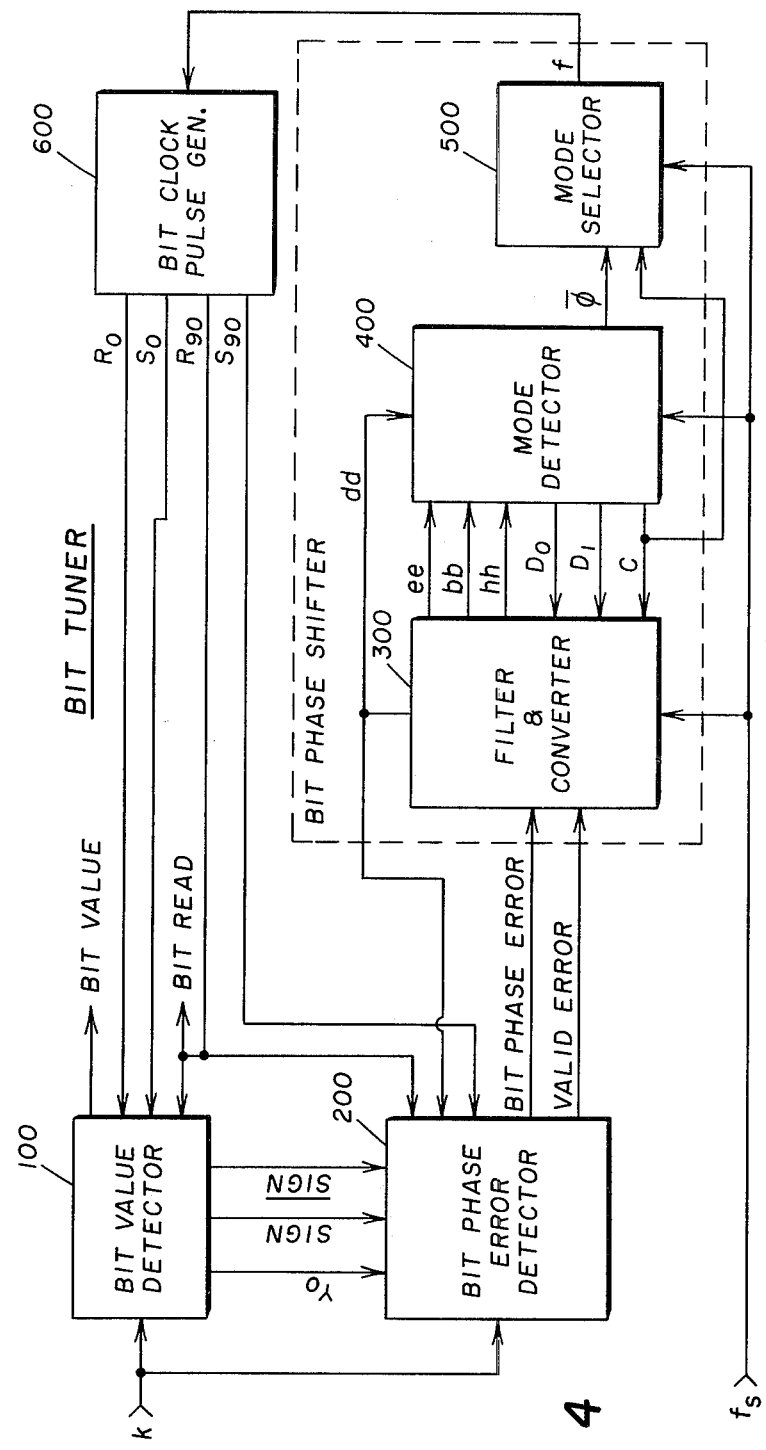

Bit Tuner (FIG. 4)

The automatic bit tuner of the present invention is illustrated in FIG. 4. The two inputs to the bit tuner are the synchronously rectified acoustic signal $k$ from the synchronous phase detector 64 (FIG. 2) and the reference clock $f_s$ from the reference signal generator 63 (FIG. 2), the reference clock $f_s$ having the same frequency as the signal $k$.

A bit value determination is carried out by the bit value detector 100 which integrates the synchronously rectified signal $k$ during each bit time interval. The integrated signal $k$ is then sampled, the polarity of the sampled integrated signal $k$ is detected, and a bit value pulse is produced for each detected "1" bit.

This bit value determination of integrating and sampling the synchronously rectified acoustic signal $k$ is under control of the bit clock generator 600. More particularly, four bit clock pulses $S_o$, $S_{90}$, $R_o$, and $R_{90}$ are generated by the bit clock 600. These bit clock pulses always are of the correct frequency but are not necessarily timed to be phased properly with respect to the true boundaries of the bit time intervals of the synchronously rectified signal $k$. Bit phase lock occurs when the bit clock pulses $S_{90}$ and $R_{90}$ are synchronized with the midpoint of the bit time interval and when the bit clock pulses $S_o$ and $R_o$ are synchronized with the true boundaries of the bit time interval of the synchronously rectified signal $k$ as illustrated in FIG. 3. Bit phasing is, therefore, the shifting in the time occurrence of the bit clock pulses until they are correctly phased.

More specifically, bit phasing is carried out by means of a bit phase error detector 200 and a bit phase shifter 700. The synchronously rectified acoustic signal $k$ is applied to the bit phase error detector 200 which integrates the signal $k$ for an integration period equal to a bit time interval, but beginning at the midpoint of the true bit time interval. This integration is initiated in response to the $R_{90}$ bit clock pulse. The bit clock $S_{90}$ then clocks the detector 200 to sample the integrated signal at the end of the integration period. If the bit clock is synchronized with the bit time intervals and a "1" bit has occurred during the bit time interval, the output of detector 200 will be zero. Any deviation from zero in the detector output will be a bipolar bit phase error signal, indicating a lack of synchronization between the bit clock pulses and the midpoints of the true bit time intervals.

This bit phase error signal from the bit phase error detector 200 is utilized by the bit phase shifter 700 to shift the phase of the bit clock pulses $S_o$, $S_{90}$, $R_o$, and $R_{90}$. Normally, when there is no bit phase error and no phase shifting of the bit clock pulses is required, the bit phase shifter 700 produces a train of synchronizing pulses $f$ in response to the reference clock pulses $f_s$ from the reference signal generator 63 (FIG. 2), one $f$ pulse being produced for each $f_s$ pulse. This pulse train $f$ is then frequency divided in the bit clock generator 600 by the number of cycles N, per bit time interval, to produce the bit clock pulses $S_o$, $S_{90}$, $R_o$, and $R_{90}$.

However, where there is lack of synchronization between the bit clock pulses and the true boundaries of the bit time intervals, a bit phase error signal will be generated by the bit phase error detector 200 and a bit phase shifting operation will be carried out by the bit phase shifter 700 as follows. The bit phase error signal is averaged over a selected number of bit time intervals. If the average bit phase error is positive, one or more $f$ pulses are injected into the train of synchronizing pulses being applied to the bit clock pulse generator 600. This causes the bit clock pulse generator 600 to produce the bit clock pulses earlier in time than they would normally occur, that is, they are phase shifted in time in accordance with the average value and sign of the bit phase error. Conversely, should the bit phase error be negative, one or more pulses are deleted from the train of synchronizing pulses. This causes the bit clock pulses to be generated later in time than they would normally occur. For each pulse injected or deleted from the train of synchronizing pulses, the bit clock pulses are phase shifted exactly one $f_s$ clock cycle. This phase shifting of the bit clock pulses controls the synchronism of the bit tuner so that the bit time intervals during which the bit value pulses are produced are accurately timed.

The bit phasing operation carried out by the bit tuner of the present invention has not been briefly described in conjunction with the bit value detector 100, the bit phase error detector 200, the bit clock pulse generator 600, and the bit phase shifter 700, as illustrated in the system block diagram of FIG. 4. Also illustrated in FIG. 4 are a filter and converter 300, a mode detector 400, and a mode selector 500 which comprise the units of the bit phase shifter 700. Each of the units 100–700 will now be individually described in detail in conjunction with the detailed schematic diagrams of FIGS. 5–10. Waveforms of various signals associated with these schematic diagrams are illustrated in FIGS. 3 and 11A–11D.

Bit Value Detection

Figure 5:
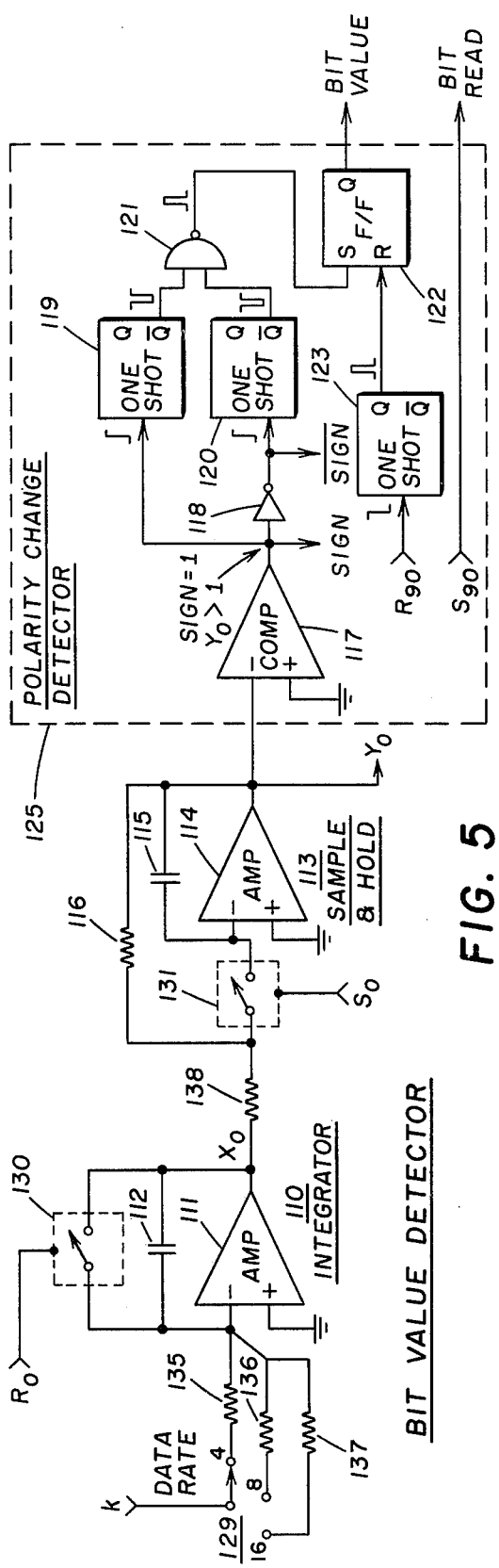
FIGS. 5–10 are detailed electrical schematics of the units illustrated in FIG. 4.
Figure 10:
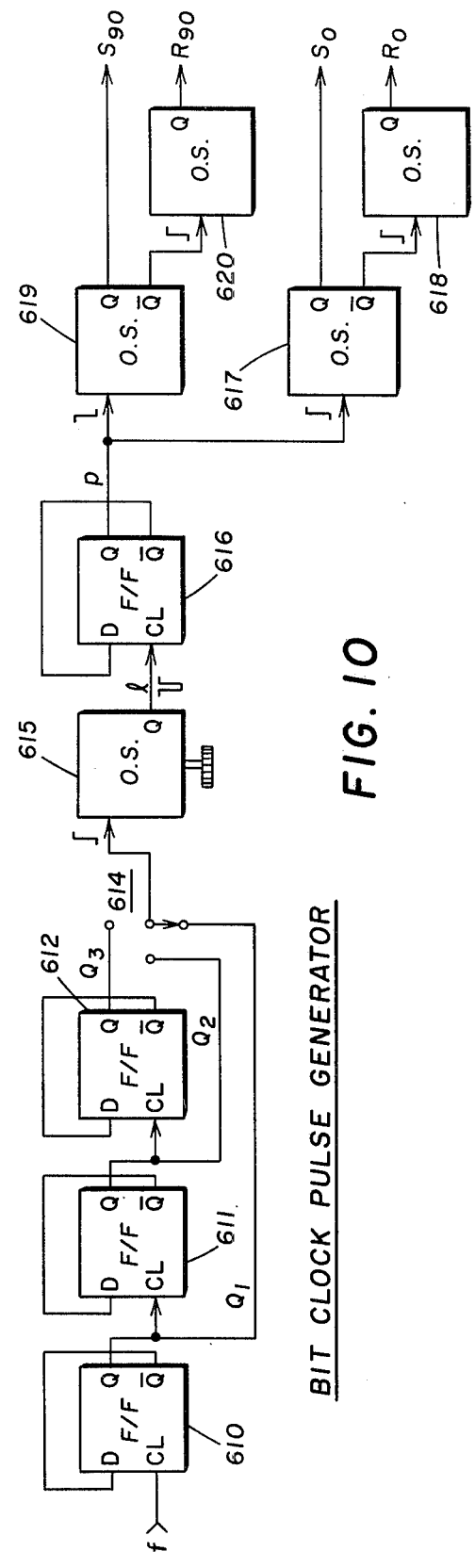

The bit value detector 100, as illustrated in FIG. 5, operates to determine the phase state of the synchronously rectified acoustic signal $k$ over a bit time interval and to produce a bit value signal indicative of such phase state. The following description of this operation will be more clearly understood by again referring to the timing diagrams illustrated in FIG. 3. Initially, the synchronously rectified signal $k$ is applied by way of data rate switch 129 including resistors 135–137 to integrator 110 which integrates the synchronously rectified acoustic signal $k$ over a bit time interval. A sample and hold circuit 113 then samples the integrated signal $k$ at the end of the bit time interval. The integrator 110 includes an operational amplifier 111 across which is connected a capacitor 112. The sample and hold circuit 113 includes the operational amplifier 114, the parallel capacitor 115, and the parallel resistor 116. At the end of the first bit time interval, the clock pulse $S_o$ closes the switch 131 to connect the integrated signal $X_o$ from integrator 110 to the sample and hold 113. Sample and hold 113 provides a $Y_o$ outputs, the sign of which is indicative of the phase state of signal $k$. The clock pulse $R_o$ occurs at the trailing edge of the clock pulse $S_o$ and is used to close the switch 130, thereby resetting the integrator 110 to zero immediately after its output $X_o$ has been sampled. Thereupon, integrator 110 integrates the signal $k$ over the next bit time interval, and, at the end of this next bit time interval, clock pulse $S_o$ again closes switch 131 and the integrator output $X_o$ is again sampled by sample and hold 113.

At the end of a bit time interval, the output $Y_o$ is, as already noted, of a sign (+ or −) which is indicative of the phase state of signal $k$. Should a "1" bit appear in the received acoustic signal at the end of a first bit time interval, the phase state of signal $k$ is changed and $Y_o$ will change sign at the end of the second bit time interval. Such a change in the sign of $Y_o$ at the end of the second bit time interval indicates the presence of a "1" bit at the end of the first bit time interval. Therefore, the integration of the signal $k$ over two bit time intervals is required to detect the phase state of the signal $k$.

A "1" bit value signal is generated each time $Y_o$ changes sign over a two-bit-time-interval period, thereby indicating a "1" bit in the received acoustic signal. A "0" bit value signal is generated each time $Y_o$ does not change sign over a two-bit-time-interval period, thereby indicating a "0" bit in the received acoustic signal. This bit value signal is produced by the polarity change detector 125 as follows. $Y_o$ is applied to a comparator 117 whose output signal SIGN is "1" when $Y_o$ is +, and is "0" when $Y_o$ is −. SIGN is inverted by an inverter 118 to produce the inverse signal $\overline{\text{SIGN}}$. SIGN and $\overline{\text{SIGN}}$ are utilized to trigger one-shot multivibrators 119 and 120, respectively. One-shot 119 is triggered on a positive edge of SIGN, while one-shot 120 is triggered on a positive edge of $\overline{\text{SIGN}}$. Prior to being triggered, the Q outputs of one-shots 119 and 120 are "1" and, consequently, NAND gate 121 is not triggered. A change in sign of $Y_o$ is detected by comparator 117, resulting in the triggering of NAND gate 121. If $Y_o$ changes from − to +, SIGN changes from "0" to "1" and triggers one-shot 119 which in turn triggers NAND gate 121. Conversely, if $Y_o$ changes from + to −, $\overline{\text{SIGN}}$ changes from "0" to "1" and triggers one-shot 120 which in turn triggers NAND gate 121. When NAND gate 121 is triggered, it sets the Q output of flip-flop 122 to a "1" bit value pulse. This "1" value pulse therefore occurs one complete bit time interval after a phase state change has occurred in the received acoustic signal.

The "1" bit value pulse remains until the flip-flop 122 is reset by the one-shot 123 which is triggered upon the trailing edge of the clock pulse $R_{90}$. However, $R_{90}$ is generated within the bit clock generator on the trailing edge of clock pulse $S_{90}$. Therefore, $S_{90}$ occurs during the presence of any "1" bit value pulse. Consequently, the clock pulse $S_{90}$ may preferably be utilized as a bit read pulse to define an expected time for the occurrence of a bit value pulse.

In summarizing the operation of the bit value detector, a change in the phase state of the received acoustic signal is detected one bit time interval after its occurrence and the instruction in the form of the bit read pulse to look for such a phase state change occurs one-half bit time interval after its detection.

Bit Phase Error Detection

Figure 6:
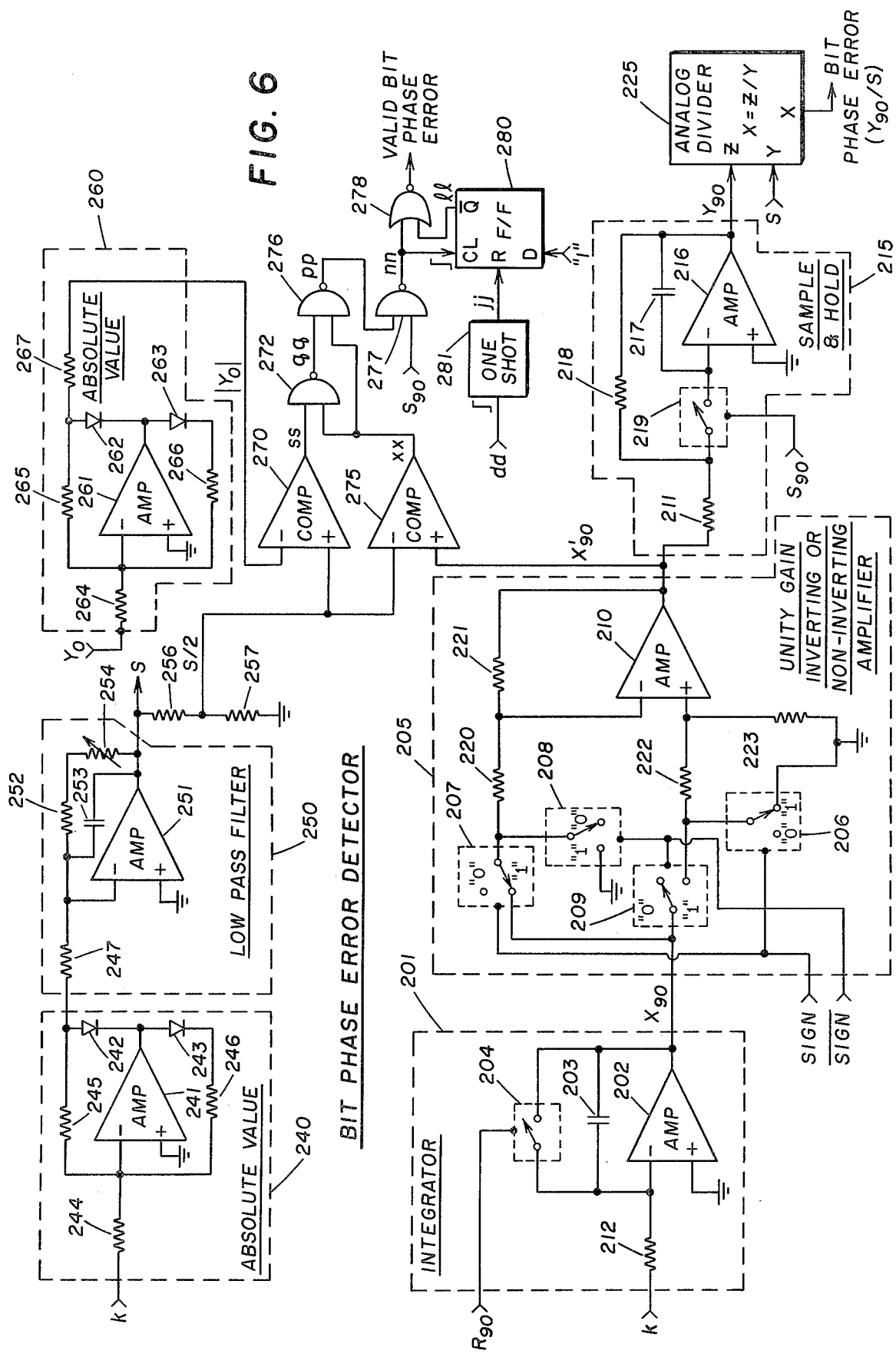
Figure 7:
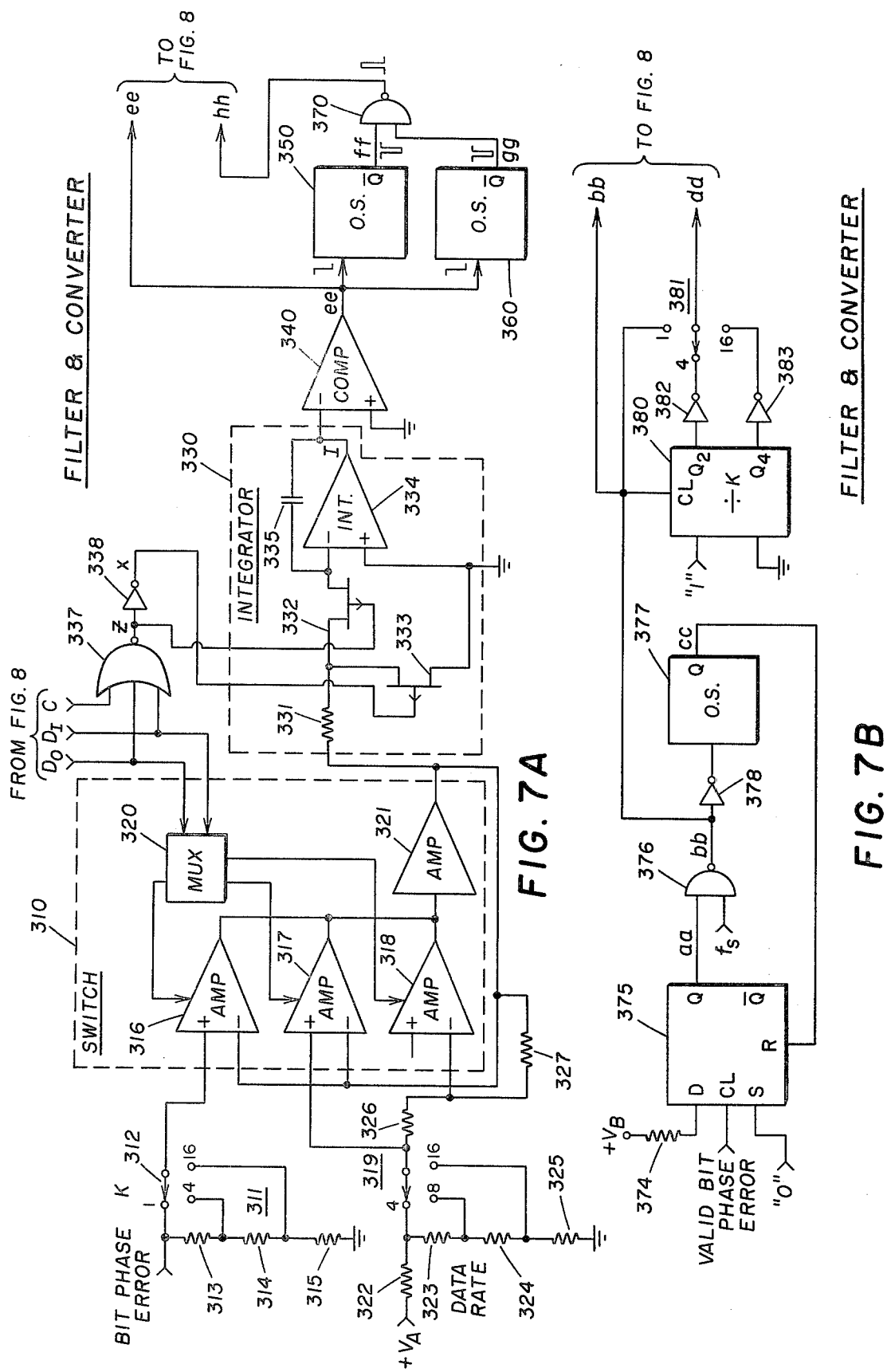
Figure 8:
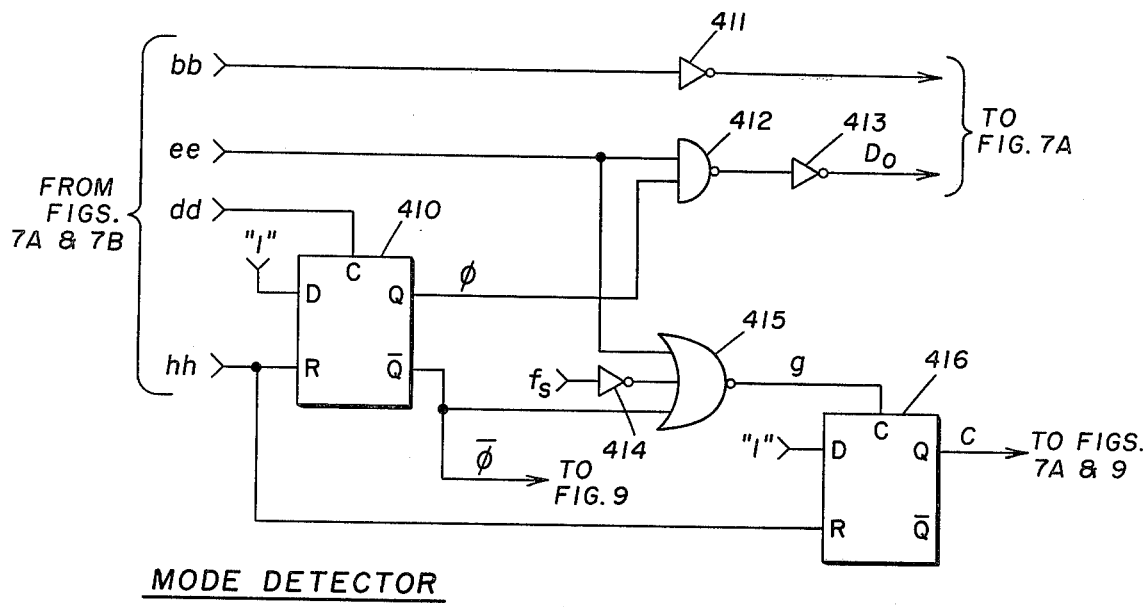
Figure 9:
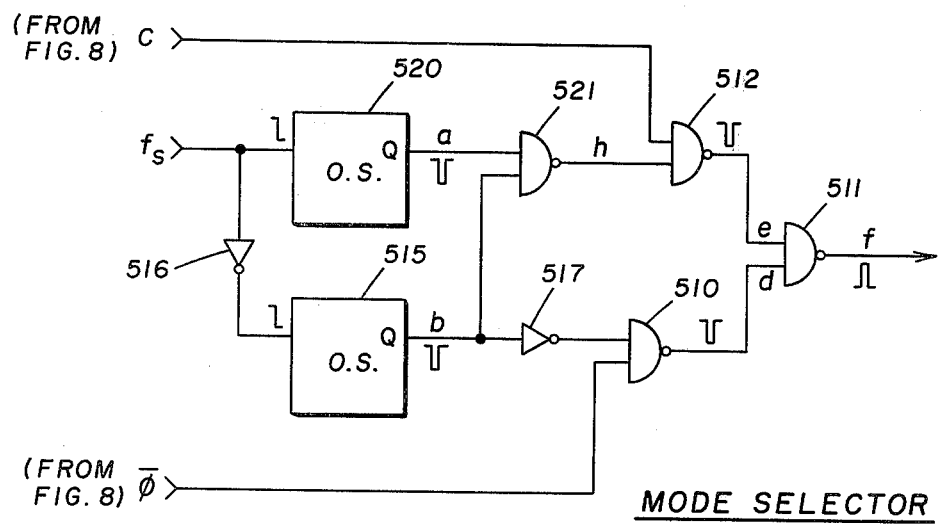

The synchronously rectified signal $k$ is applied as the input to the bit phase error detector 200 of FIG. 6 along with the $Y_o$ signal from the bit value detector 100.

The signal $k$ is applied to an inverting integrator 201 whose output is $X_{90}$. Integrator 201 includes an operational amplifier 202 across which is connected the capacitor 203. Integrator 201 is reset by the closing of switch 204 on the leading edge of clock pulse $R_{90}$. The trailing edge of clock pulse $R_{90}$ opens switch 204 and permits integrator 201 to integrate the signal $k$ over the period from the midpoint of a bit time interval to the midpoint of the next succeeding bit time interval. If a phase state change occurs in the signal $k$ during the period of this integration and there is correct bit phasing by the bit clock pulses, the output $X_{90}$ of integrator 201 at the end of its integration period is zero. If not, there is a bit phase error and the integrator's output $X_{90}$ at the end of its integration period is proportional to such bit phase error.

The output $X_{90}$ is applied to a unity gain inverting or noninverting amplifier 205 which includes four signal controllable switches 206-209 and an operational amplifier 210. Amplifier 205 operates to produce an $X'_{90}$ signal which is identical with $X_{90}$ if a "1" $\overline{\text{SIGN}}$ pulse is present or is the inverse of $X_{90}$ if a "1" SIGN pulse is present. It should be remembered that SIGN and $\overline{\text{SIGN}}$ are produced by the bit value detector as an indication of the phase state of signal $k$. For example, if the phase state of signal $k$ is +, then SIGN is "1". SIGN therefore sets switches 206 and 207 to a "1" position which permits the $X_{90}$ signal to be applied to the inverting input and ground to be applied to the noninverting input of operational amplifier 210. In this case, $X'_{90}$ will be of the opposite sign from $X_{90}$. Conversely, if the phase state of signal $k$ is −, then $\overline{\text{SIGN}}$ is "1" and switches 208 and 209 are set to apply $X_{90}$ to the noninverting input and ground to inverting input of operational amplifier 210. In this case, $X'_{90}$ is identical with $X_{90}$. $X'_{90}$ is therefore representative of both the magnitude and the sign of the bit phase error at the end of the integration period of the integrator 201.

The waveform $X'_{90}$ is applied to sample and hold circuit 215 which includes the operational amplifier 216 across which are connected the capacitor 217 and resistor 218. Upon the occurrence of clock pulse $S_{90}$, switch 219 is closed and sample and hold 215 samples the value of $X'_{90}$, producing the output $Y_{90}$. If there is a bit phase error and a "1" occurs in the signal $k$ during an integration period of integrator 201, $Y_{90}$ will have the same sign as the bit phase error. If a "1" does not occur during the integration period of integrator 201, $Y_{90}$ is a maximum. If the bit phase error is zero, $Y_{90}$ is 0 as it represents the integral of opposite polarities for equal times.

$Y_{90}$ is not utilized directly as a bit phase error signal but is first normalized and then utilized as a bit phase error signal. $Y_{90}$ is applied to an analog divider 225 which divides $Y_{90}$ by the function S which is the average value of the signal $k$ over several bit time intervals. In this manner, a normalized bit phase error signal $Y_{90}/S$ is produced which is independent of the amplitude of the signal $k$.

The function S is generated by the absolute value detector 240 and the low-pass filter 250. The waveform $k$ is applied to absolute value circuit 240 including the operational amplifier 241, diodes 242 and 243, and resistors 244–246. The output of absolute value circuit 240 is always a full-wave positive rectified signal which is applied to a low-pass filter 250 including the operational amplifier 251, capacitor 253, and resistors 247, 252, and 254. Low-pass filter 250 produces an output S across the resistors 256 and 257. S is the DC value of the absolute value of $k$ and is therefore representative of signal amplitude. The gain of resistor 254 is adjusted so that S is equal to the integral of signal $k$ over a bit time interval having no bit phase error. Since the absolute value circuit 240 and low-pass filter 250 operate continuously, S is an average value over several bit time intervals. Correct bit phasing is not required in order for S to read the true signal amplitude. Accordingly, S is used in the generation of the signal $Y_{90}/S$ which is dependent only on the bit phase error. However, $Y_{90}/S$ is a true bit phase error only when a "1" occurs in the waveform $k$ during the integration period of integrator 201. Therefore, it is necessary to determine if a "1" occurred during this interval. This determination is carried out in the following manner. The $Y_o$ signal from the bit value detector 100 is applied to the absolute value circuit 260 which includes the operational amplifier 261, diodes 262 and 263, and resistors 264–267. The output of absolute value detector 260 is $|Y_o|$ which is applied to comparator 270 along with an S/2 output from the resistor 257. Since $Y_o$ is updated in the bit value detector 100 upon the occurrence of each $S_o$ pulse, the output of comparator 270 can change only upon each $S_o$ pulse. The output ss of comparator 270 is a logic "1" if $|Y_o| < S/2$ and a logic "0" if $|Y_o| > S/2$. The S/2 output is also applied to comparator 275 along with the $X'_{90}$ signal. Comparator 275 provides the output signal $xx$ which is a logic "1" if $X'_{90} > S/2$ and is a logic "0" if $X'_{90} < S/2$.

By utilizing the outputs from these two comparators, a determination is made as to whether or not $Y_{90}/S$ can be considered a valid bit phase error. Either of the following two conditions will produce a valid bit phase error:

$$X'_{90} < S/2 \qquad 1.$$

$$(X'_{90} > S/2) \text{ and } (|Y_o| < S/2) \qquad 2.$$

The outputs ss and xx of comparators 270 and 275 are applied to NAND gate 272. The output of gate 272 is the signal $qq$. Signals $xx$ and $qq$ are applied to NAND gate 276. The output of gate 276 is pp which will be "1" when $xx$ is "0", indicating $X'_{90} < S/2$, and when $xx$ is "1" and ss is "1", indicating $X'_{90} > S/2$ and $|Y_o| < S/2$. A logic "1" pp signal will cause NAND gate 277 to provide a "0" $nn$ signal upon the occurrence of an $S_{90}$ clock pulse. Normally, nn will trigger NOR gate 278 to provide a "1" valid bit phase error signal, this valid bit phase error signal therefore occurring upon an $S_{90}$ clock pulse in the presence of either of the above-mentioned conditions. It can therefore be understood that the $S_{90}$ clock pulse switches the sample and hold 215 to update the bit phase error signal $Y_{90}/S$ and simultaneously triggers gate 277 to permit gate 278 to produce a valid bit phase error signal if the bit phase error is really valid in accordance with the two required conditions as set forth above.

However, should the signal $ll$ from flip-flop 280 be "1", then gate 278 is prevented from producing a "1" valid bit phase error signal. Signal $ll$ is "1" coincidental with the first $S_{90}$ clock pulse after a bit phase shift of the bit clock pulse generator. During the bit phase shift, $f$ pulses are added or deleted, thereby changing the bit time interval. It has been found desirable to inhibit the first bit phase error measured after a bit phase shift since it has been measured over an improper bit time interval. To accomplish this, a dd signal is produced by the bit phase shifter 700 (as will be described later) upon each bit phase shift. The leading edge of dd triggers one-shot 281 whose output $jj$ then resets the $\bar{Q}$ output of $ll$ of flip-flop 280 to "1". This "1" $ll$ signal inhibits NOR gate 278 during the first nn pulse after a bit phase shifter. This nn pulse does, however, clock the "1" input at the data input of flip-flop 280 onto the Q output line. This clocking of a "1" onto the Q output provides a "0" on the $\bar{Q}$ output. The $\bar{Q}$ output, or $ll$ pulse, now being "0", permits NOR gate 278 to pass the next succeeding nn pulse as a "1" valid bit phase error.

BIT PHASE SHIFTING

The bit phase shifter 700 accumulates an average bit phase error by integrating K valid bit phase errors. The integration time $T_S$ for each valid bit phase error is fixed at one-half cycle of the waveform $f_s$. A positive value of $Y_{90}/S$ indicates a positive bit phase error. A negative value of $Y_{90}/S$ indicates a negative bit phase error. After K integrations of $Y_{90}/S$, the integrated signal I is then converted into a shift interval which is linearly proportional to I. The sign of I is detected and a reference voltage of appropriate sign is selected and applied to the input of the integrator, causing the integrator's output to ramp toward zero. The sign change which occurs as the integrator's output ramps through zero is detected and utilized to terminate the integration. The time required for the integrator's output to reach zero is defined as the shift interval and, as previously pointed out, is proportional to the value of I at the end of the Kth bit phase error integration. During this shift interval, $f$ pulses are deleted or injected depending on the sign of I in such a way as to advance or retard the time generation of the bit clock pulses by the bit clock generator 600.

The bit phase shifter 700 will now be described in detail in the following three sections (a), (b) and (c) with respect to the three units: filter and converter 300,
mode detector 400, and mode selector 500, respectively. The bit clock pulse generator 600 will be described in detail in section (d). Following sections (a)–(d) the bit phase shifting operation will be more fully understood by a discussion of the timing sequence of the pulses produced by the filter and converter 300, the mode detector 400, mode selector 500, and the bit clock generator 600.

(a) Filter and Converter 300

The bit phase error is applied to a voltage divider 311 including resistors 313–315. The setting of switch 312 along the voltage divider determines the number, K, of valid bit phase errors to be averaged, for example, 1, 4, or 16 errors. The bit phase errors are then coupled by switch 312 to the PRAM switch 310. Switch 310 includes three operational amplifiers 316–318, the multiplexer 320, and the buffer amplifier 321. The buffer amplifier 321 is coupled to the integrator 330 including an input resistor 331, FET switches 332 and 333, the operational amplifier 334, and the capacitor 335.

Switch 310 and integrator 330 are controlled by the mode control pulses $D_0$, $D_1$, and C. The particular logic combination of $D_0$ and $D_1$ applied to multiplexer 320 determines which of the operational amplifiers 316–318 are to be operative. The particular combination of $D_0$, $D_1$, and C applied to NOR gate 337 and inverter 338 determines whether or not integrator 330 integrates its input or holds its output. $D_0$, and $D_1$, and C are generated by the mode detector 400. The possible logic combinations of $D_0$, $D_1$, and C are as follows:

| $D_0$ | $D_1$ | C | OPERATIONAL MODE |
|---|---|---|---|
| 0 | 1 | 0 | Integration |
| 0 | 0 | 0 | Holding an integration |
| 0 | 0 | 1 | Injection |
| 1 | 0 | 0 | Deletion |

Initially the logic combinations are set for the integration mode as follows: $D_0 =$ "0", $D_1 =$ "1", and $C =$ "0". With this combination, multiplexer 320 selects operational amplifier 316 to pass the bit phase error to the buffer amplifier 321, which in turn applies the bit phase error to the inverting integrator 330. FET switch 332 is biased ON by a "1" from NOR gate 337, and FET switch 333 is biased OFF by a "1" from inverter 338. This particular logic combination automatically occurs, as will be subsequently described, each time a valid bit phase error pulse occurs. Integrator 330 integrates $Y_{90}/S$ for a fixed time $T_S$ after this mode is initiated. Consecutive integrations are performed on successive valid bit phase errors until K errors have been averaged, thereby producing an average bit phase error I.

When I is positive, the bit clock pulses are occurring too early in time and consequently $f$ pulses need to be deleted to obtain correct bit phasing. Conversely, when I is negative, $f$ pulses need to be injected to obtain correct bit phasing. To determine the sign of the average bit phase error, I is applied to the comparator 340 whose output is the pulse $ee$. A "0" ee indicates I is negative and injection is required. A "1" ee indicates I is positive and deletion is required. The operation of injection or deletion occurs after K valid bit phase errors have been averaged and is controlled by the mode detector 400 and mode selector 500 in response not only to ee but also to hh, bb, and dd. The generation of these pulses will now be described following which the operation of the mode detector 400 and mode selector 500 in controlling injection and deletion can be described.

The pulse hh is generated by the pulse ee. Pulse ee is applied to a one-shot multivibrator 350 and through an inverter 351 to a one-shot multivibrator 360. These one-shots form a polarity detector. When ee changes from "1" to "0", one-shot 350 produces the pulse ff. When ee changes from "0" to "1", one-shot 360 produces the pulse gg. Either ff or gg provides for the pulse hh by way of NAND gate 370. Pulse hh is produced, therefore, each time the average bit phase error changes sign and is applied to the mode selector 400 to terminate a phase shift interval.

The pulses bb and dd are produced by the circuitry shown in FIG. 7B in response to a valid bit phase error. A valid bit phase error clocks the flip-flop 375 to transfer the "1" on the data input to the Q output as the aa pulse. When both aa and $f_s$ are "1"s, NAND gate 376 provides "0" bb pulse. Pulse bb has, therefore, been triggered by a valid bit phase error and remains triggered for one-half cycle of $f_s$. After one-half cycle of $f_s$, the $f_s$ input to NAND gate 376 returns to zero and bb changes to "1". This transition in waveform bb triggers one-shot multivibrator 377 by way of inverter 378 to produce the pulse cc. Pulse cc resets flip-flop 375 to zero until the occurrence of the next valid bit phase error.

Pulse bb is connected to position 1 of the K selection switch 381 and to the clock input of the divide-by-K counter 380. Counter 380 is a binary counter which is incremented one count for each bb pulse. Counter 380 provides a "1" $Q_2$ output after four valid bit phase error signals and a "1" $Q_4$ output after 16 valid bit phase errors. The $Q_2$ output is connected by way of inverter 382 to position 4 of switch 381 while the $Q_4$ output is connected by way of inverter 383 to position 16 of switch 381. The output from switch 381 is the dd pulse. Pulse dd will change from "0" to "1" upon the occurrence of K valid bit phase errors, K being selectable to 1, 4, or 16 by the position of switch 381. A "1" dd pulse is applied to the mode selector 400 to initiate a bit phase shift interval after either 1, 4, or 16 errors, depending on setting of switch 381.

(b) Mode Detector 400

The utilization of the pulses bb, dd, ee, and hh by the mode detector 400 to produce the mode control pulses $D_0$, $D_1$, and C for the control of filter and converter 300 will now be described in detail.

The pulse dd is applied to the clock input of a flip-flop 410 to initiate conversion of an average bit phase error into shift interval pulses $\Phi$ and $\bar{\Phi}$. When dd is "0", $\Phi$ is "0", and $\bar{\Phi}$ is "1", no shift is initiated. When dd changes to "1", its leading edge clocks flip-flop 410 to transfer the "1" at the data input onto the Q output as a "1" phase shift pulse $\Phi$. When $\Phi$ becomes "1", a phase shift is initiated.

Mode control pulse $D_1$ is produced in the following manner. The pulse bb is applied to inverter 411. The output of inverter 411 is the mode control pulse $D_1$ and is "1" only during the time a bit phase error is to be integrated. Pulse bb is triggered by a valid bit phase error pulse and is only "0" when the current $Y_{90}/S$ is to be integrated. Therefore, $D_1$ is the inverted value of bb.

Mode control pulse $D_0$ is produced in the following manner. Phase shift $\Phi$ and pulse ee are applied to NAND gate 412. The output of NAND gate 412 is inverted through inverter 413 as the mode control pulse $D_0$. $D_0$ is "1" only when a phase shift is to be carried out by the deletion of f pulses. If ee is "1", the bit clock pulses are occurring too early in time and deletion is required. Therefore, when ee is "1" and $\Phi$ is "1", NAND gate 412 and inverter 413 produce a "1" mode control pulse $D_0$. So long as $D_0$ is "1", the normal f pulses which are produced upon each leading edge of the $f_s$ pulses are deleted.

Mode control pulse C is a logical function of $\bar{\Phi}$, ee, and $f_s$ and relates to count injection. Pulses $f_s$ are inverted by way of inverter 414 and applied to NOR gate 415 along with $\bar{\Phi}$ and ee. When ee is "0", the bit clock pulses are occurring too late in time and f pulses need to be injected. When $\bar{\Phi}$ is "0", K bit phase errors have been averaged. With $\Phi$ and ee both at "0", NOR gate 415 produces a "1" output pulse g upon the leading edge of the next $f_s$ pulse. Pulse g being applied to the clock input of flip-flop 416, transfers the "1" on the data input onto the Q output as the mode control pulse C. Therefore, mode control pulse C becomes "1" whenever counts are to be injected.

(c) Mode Selector 500

The mode control pulse C is applied to the mode selector 500 along with the $f_s$ and $\bar{\Phi}$ pulses. Pulse $f_s$ triggers one-shot 520 which produces the pulse a. Pulse $f_s$ also triggers one-shot 515 by way of inverter 516 to produce the pulse b. Both a and b are applied to NAND gate 521. Gate 521 provides the pulse h upon the presence of either pulse a or b. Upon the presence of the mode control pulse C, NAND gate 512 provides the pulse e in response to each pulse h. When the input pulse C is not present, NAND gate 512 is inhibited and pulse e is not produced.

Pulse b is applied through inverter 517 to NAND gate 510 along with $\bar{\Phi}$. When $\bar{\Phi}$ is present, it enables NAND gate 510 to produce the pulse d upon the occurrence of each pulse b. When $\bar{\Phi}$ is not present, NAND gate 510 is inhibited and pulse d is not produced.

Both pulses d and e are applied to output NAND gate 511. Gate 511 produces the output pulse train f in response to the occurrence of either pulse d or e. It is this pulse train f which, when applied to the bit clock 600, causes the time shifting of the bit clock pulses until they are correctly synchronized with the true boundaries of the bit time interval and the midpoint of the bit time interval, respectively.

(d) Bit Clock Pulse Generator 600

The train of f pulses is applied to the clock input of the first of three series-connected flip-flops 610, 611, and 612. Each acts as a divide-by-2 counter to produce the square waves $Q_1$, $Q_2$, and $Q_3$ as shown in FIG. 11D. These three square waves, $Q_1$, $Q_2$, and $Q_3$, represent data rates of 4, 8, and 16 cycles per bit time interval, respectively, and are selectively coupled by way of switch 614 to one-shot multivibrator 615 which produces a negative-going pulse l. Pulse l clocks flip-flop 616, which operates as a divide-by-2 counter, to produce the square wave p. The period of square wave p is one bit time interval. The leading edge of p triggers one-shot multivibrator 617 which produces the bit clock pulse $S_o$ at its Q output. The $\bar{Q}$ output triggers one-shot multivibrator 618 to produce the bit clock pulse $R_o$ on the trailing edge of $S_o$. In similar manner, the trailing edge of square wave $p$ triggers one-shot multivibrator 619 to produce the bit clock pulse $S_{90}$ at its Q output. The $\overline{Q}$ output triggers one-shot multivibrator 620 to produce the bit clock pulse $R_{90}$ on the trailing edge of $S_{90}$.

The automatic bit phasing operation can then be utilized to inject or delete $f$ pulses so as to adjust the bit clock pulses $S_o$, $R_o$, $S_{90}$, and $R_{90}$ earlier or later in time to occur approximately at the midpoints and true boundaries of the bit time intervals. By injecting an additional $f$ pulse, the bit clock pulses $S_o$, $R_o$, $S_{90}$, and $R_{90}$ will all occur one cycle earlier in time. Be deleting an $f$ pulse, the bit clock pulses will all occur one cycle later in time. The pulse $l$ of one-shot 615 has a pulse width $\tau$ which is manually adjustable to control the time delay for the production of $S_o$, $R_o$, $S_{90}$, and $R_{90}$. This time delay $\tau$ is preferably set on initial operation so that $S_{90}$ and $R_{90}$ occur exactly at the midpoints of the bit time intervals, and $S_o$ and $R_o$ occur exactly at the boundaries of the bit time intervals. In this manner, bit phasing is automatic and precise.

Having now described each of the units 300–500 of the bit phase shifter 700 and the bit clock pulse generator 600, a more thorough understanding of bit phase shifting may be had by a more detailed discussion of the timing sequence of the pulses produced by these units as illustrated in FIGS. 11A–11D.

Beginning with the bit phase error detector 200, the signal $k$ is integrated over a bit time interval and the integrated signal sampled at the midpoint of each bit time interval to determine any bit phase error, the bit phase error indicating a lack of synchronization between the bit clock pulses and the true bit time intervals. Also, as previously discussed, the bit phase error detector 200 produces the valid bit phase error signal.

When there has been no valid bit phase error, a pulse $f$ is produced by the mode selector 500 on each leading edge of $f_s$. However, when there is a valid bit phase error, $\overline{\Phi}$ will be set to "0", indicating that K valid bit phase errors have been averaged (K = 1, 4, or 16). If C is also "0", the normal pulses $f$ will be deleted and the shift interval will begin on a trailing edge of $f_s$. For this case, the shift interval will have to equal one-half cycle of $f_s$ before the first normal $f$ pulse would be deleted. If C is a "1" and $\overline{\Phi}$ is "0", pulses will be injected in addition to the normal $f$ pulses. For this case, the shift interval begins on a leading edge of $f_s$, the normal $f$ pulse which would occur at this time is produced, and, if the shift interval exceeds one-half cycle of $f_s$, an additional pulse will be injected on the next trailing edge of $f_s$.

Figure 11B:
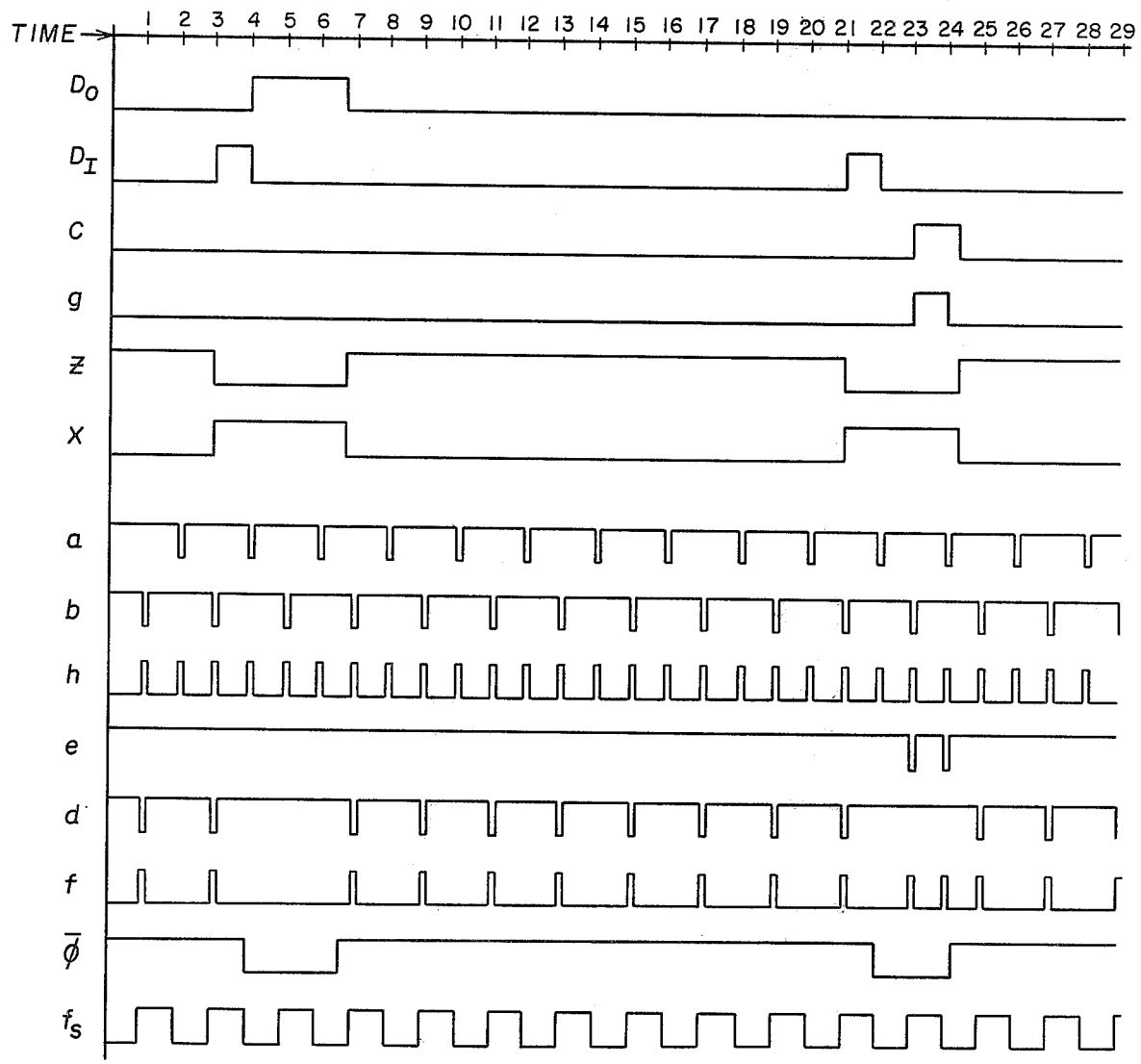

More particularly, from $t = 0$ to $t = 3$, $\overline{\Phi}$ was a "1" and C was a "0" as is shown in FIG. 11B. $\overline{\Phi}$ enabled NAND gate 510 and the pulses $b$ were transmitted as the pulses $d$ to NAND gate 511. C disabled NAND gate 512; therefore, the pulses $h$ were inhibited. Pulses $d$ therefore appeared at the output of NAND gate 511 as the normal pulses $f$. Normally, pulses $b$ produce pulses $f$. Pulses $b$ are produced at the output of one-shot multivibrator 515 on each leading edge of $f_s$. Therefore, the pulses $f$ normally occur on a leading edge of $f_s$ when C is "0" and $\overline{\Phi}$ is "1". A leading edge of $f_s$ occurs at $t_1$ and $t_3$. Since C is "0" and $\overline{\Phi}$ is "1", the pulses $f$ also occur at $t_1$ and $t_3$.

Figure 11C:
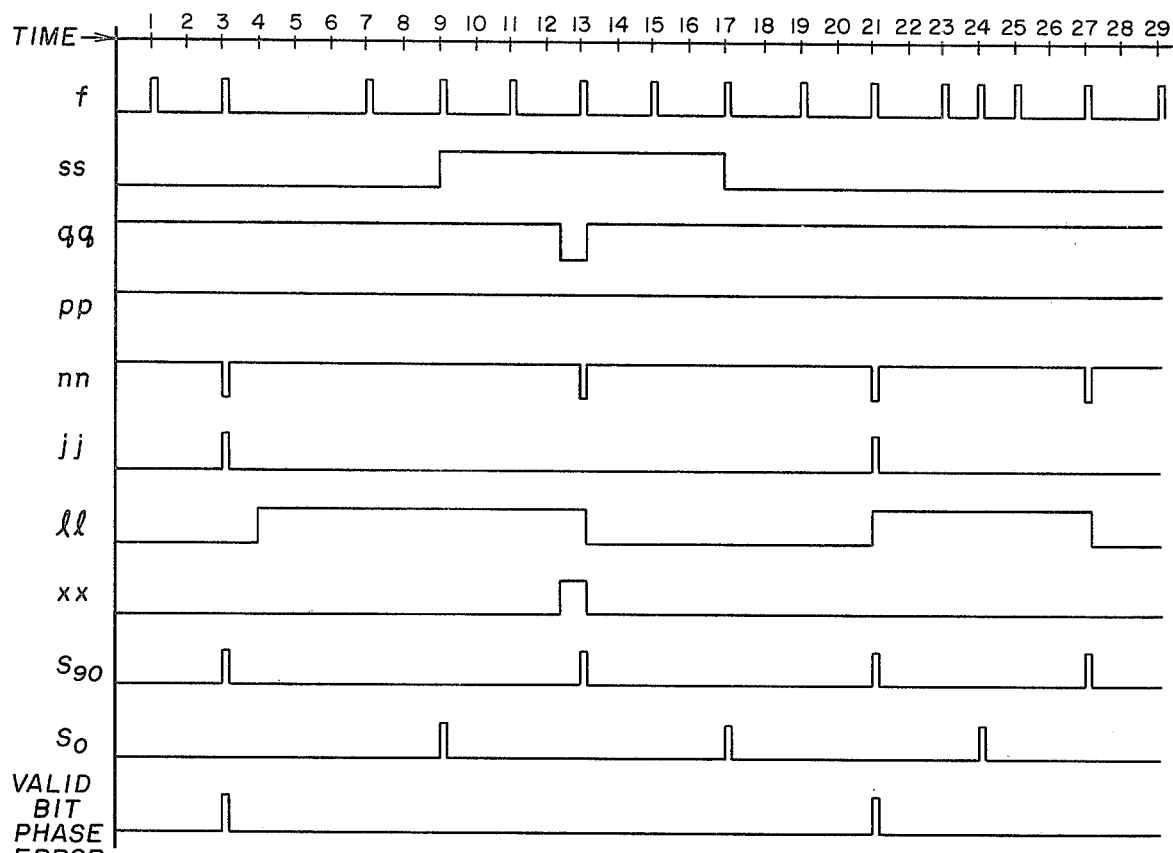
Figure 11D:
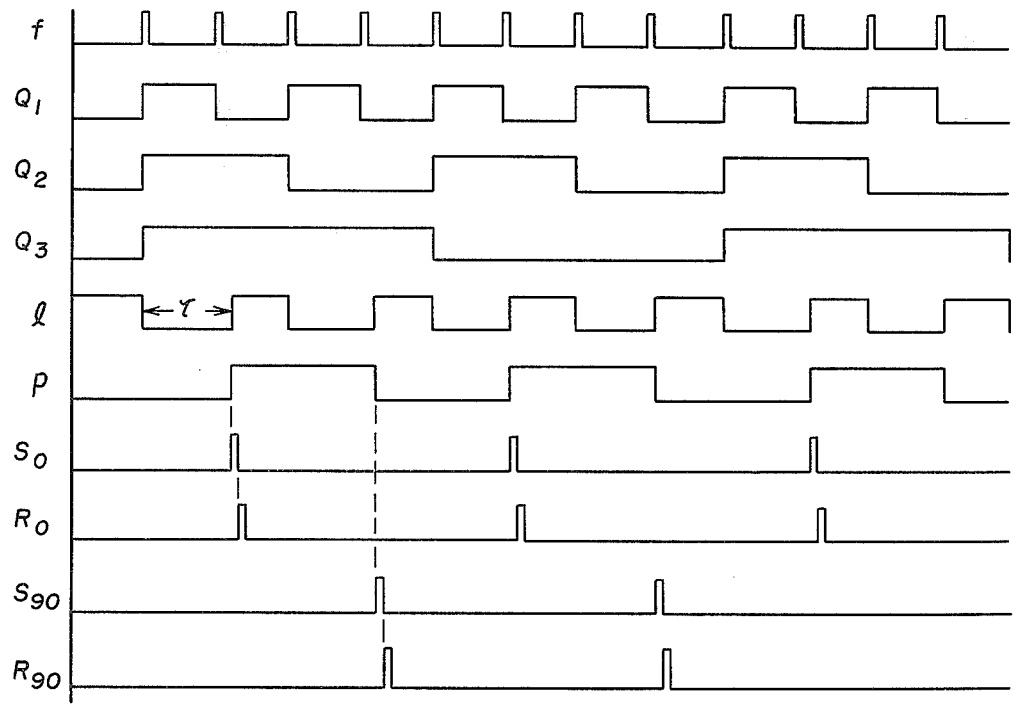

At time $t = 3$, $S_{90}$ is produced by the bit clock 600 as shown in FIG. 11C. At this time, $pp$ is "1" since both $ss$ and $xx$ are "0". Since $pp$ is a "1" when $S_{90}$ occurs, the output $nn$ of gate 277 will be "0" for the duration of $S_{90}$. $ll$ is also "1" at $t = 3$, thereby providing for a valid bit phase error signal.

The valid bit phase error is applied to the filter and converter 300 which produces $aa$. Both $aa$ and $f_s$ are "1" at $t = 3$ and therefore produce a "0" $bb$ pulse as shown in FIG. 11A. Pulse $bb$ remains at "0" until $f_s$ returns to "0" at $t = 4$. At $t = 4$, $bb$ changes to "1", thereby triggering one-shot 377 to produce the pulse $cc$ for resetting the flip-flop 375. A "0" $bb$ pulse is therefore produced for every valid bit phase error. If switch 381 is set to position 1, a $dd$ pulse is produced for each $bb$ pulse and consequently a phase shift is generated for each valid bit phase error. If switch 381 is on positions 4 or 16, a phase shift is produced after the divide-by-K counter 380 counts up to 4 and 16 valid bit phase errors, respectively. It is to be noted, however, that timing diagrams of FIGS. 11A–11C are based on a phase shift on each valid bit phase error.

The pulse $dd$ is applied to mode detector 400. The leading edge of $dd$ at the clock input to flip-flop 410 transfers the "1" connected to the data input to its output as a "1" $\Phi$ signal at $t = 4$. This indicates that a phase shift is now to occur. By way of example of FIG. 11A, the bit phase error $Y_{90}/S$ is negative and pulse deletion is therefore required. $ee$ is "1" representative of a positive I. Since both $ee$ and I are "1" at $t_4$, the count deletion pulse $D_o$ changes to "1". This causes the multiplexer 320 to trigger operational amplifier 317 to apply a $+V_A$ to integrator 330 by way of a data rate switch 319 to cause it to begin ramping to zero at $t_4$ at a rate determined by the setting of switch 319 across the voltage divider including resistors 322–325. The output I of integrator 330 as illustrated in FIG. 11A for a data rate setting of 4 acoustic cycles per second reaches zero between $t_6$ and $t_7$. Coincident with I reaching zero, $ee$ changes to "0" and triggers one-shot 350 and gate 370 to produce the pulses $ff$ and $hh$, respectively. Pulse $hh$ is applied to the mode detector 400 where it resets flip-flop 410 to change $\Phi$ to "0" and $\overline{\Phi}$ to "1". The shift interval is thereby terminated.

Since the shift interval for deletion begins at $t_4$ and persists until a time between $t = 6$ and $t = 7$, the normal $f$ pulse that would have occurred at $t = 5$ is deleted as seen in FIG. 11B. At $t = 4$, $\overline{\Phi}$ is "0" and C is "0". Therefore, both NAND gates 510 and 512 are disabled. Pulses $e$ and $d$ are both inhibited and the $f$ pulse at $t = 5$ is therefore deleted.

Since $\overline{\Phi}$ changes to a "1" just prior to $t_7$ and C remains a "0", gate 510 is enabled and the next normal $f$ pulse occurs at $t_7$ on a leading edge of $f_s$. One $f$ pulse was deleted and, upon application of the pulse train $f$ to the bit clock 600, the time occurrences of clock pulses $S_o$ and $S_{90}$ are delayed by exactly one cycle of $f_s$. The first $S_{90}$ pulse occurred at $t_3$. Since N = 4, the next normal $S_{90}$ pulse would have occurred at $t_{11}$. However, since one $f$ pulse was deleted, the next $S_{90}$ pulse occurs at $t_{13}$, exactly one full $f_s$ cycle later. However, this $S_{90}$ pulse cannot trigger a valid bit phase error signal since, as discussed in detail earlier, the "1" $ll$ pulse at this time inhibits NOR gate 278 from producing a valid bit phase error signal during the first $nn$ pulse after a phase shift.

This next $nn$ pulse occurs at $t = 21$ in response to the next $S_{90}$ pulse and produces a valid bit phase error pulse. This $S_{90}$ pulse occurs exactly four $f_s$ cycles later than the pulse at $t_{13}$. $Y_{90}/S$ is again integrated and is shown in FIG. 11A as being positive. Consequently, its integral I ramps negative. At $t_{22}$, $f_s$ changes to "0", terminating the integration. Since I is negative, count injection is required during the shift interval. However, the shaft is not initiated until one-half cycle of $f_s$ later at $t = 23$. This delay is carried out by way of NOR gate 415 which inhibits the production of mode control pulse C until $f_s$ changes to "1".

At $t_{23}$, $f_s$ changes to a "1", enabling gate 415. $g$ changes to a "1" and is applied to the clock input of flip-flop 416 which changes its output, C, to a "1", thereby beginning the shift interval on a leading edge of $f_s$.

At $t_{23}$ when C changes to a "1", gate 512 is enabled to permit the pulses $h$ to appear at the output of gate 512 as the pulses $e$. Pulses $h$ are produced on both the leading and trailing edges of $f_s$. Gate 512 is enabled on the leading edge of the pulse C which occurs at $t_{23}$. Therefore, at $t_{23}$, a pulse $e$ occurs at a leading edge of $f_s$ and appears at the output of gate 511 as a normal $f$ pulse. At $t_{24}$, a pulse $e$ occurs at a trailing edge of $f_s$ and appears at the output of gate 511 as an additional or injected pulse $f$. Between $t_{24}$ and $t_{25}$, C is reset to "0" and $\bar{\Phi}$ changes to a "1". Gate 512 is disabled and gate 510 is enabled. At $t_{25}$, pulse $b$ occurs on a leading edge of $f_s$ and produces the next normal pulse $f$. By this technique, counts are injected on each trailing edge of $f_s$ during a shift interval. A shift interval always begins on a leading edge of $f_s$ for count injection. An extra pulse has been injected at $t_{24}$. I ramps positively toward zero between $t = 24$ and $t = 25$. Coincident with I reaching zero, $ee$ changes from "0" to "1". This transition triggers one-shot 360 to produce the pulse $gg$ which appears at the output of NAND gate 370 as the pulse $hh$. Pulse $hh$ is applied to the reset inputs of flip-flops 410 and 416, resetting $\Phi$ to "0", C to "0", and $\bar{\Phi}$ to "1". This terminates the shift interval.

Having now described the bit tuner of the present invention in conjunction with the circuitry illustrated in FIGS. 5–10, it is to be understood that such circuitry is merely representative of one embodiment. In accordance with such embodiment, the following sets forth specific types and values of the circuit components.

| Reference Designation | Description |
| --- | --- |
| All NAND gates | CD4011A COS/MOS (R.C.A.) |
| NOR gate 415 | CD4025A COS/MOS (R.C.A.) |
| All other NOR gates | CD4001A COS/MOS (R.C.A.) |
| All inverters | CD4009A COS/MOS (R.C.A.) |
| All flip-flops | CD4013A COS/MOS (R.C.A.) |
| Counter 380 | CD4029A COS/MOS (R.C.A.) |
| One-shot multivibrator 615 | NE555 (Signetics) |
| All other one-shot multivibrators | SN74121 (Texas Instruments) |
| Integrator 334 | 3307 (Burr-Brown) |
| Switch 310 | HA-2404 Dual Slope PRAM (Harris Semiconductor) |
| FET switches 332 and 333 | 2N3993 (Motorola) |
| All comparators | 734 Fairchild |
| All operational amplifiers | 741 Fairchild |
| Analog divider 225 | 4452 (Philbrick) |

We claim:

1. In the logging of a well having a downhole acoustic transmitter for transmitting upward through a drilling liquid inside a drill string an acoustic signal modulated between at least two modulation states so as to be encoded with information relating to a measured downhole condition, each modulation state being transmitted over a predetermined number of acoustic signal cycles which define a bit time interval; and an uphole receiver for demodulating the acoustic signal to produce an output signal representative of the modulation state of the acoustic signal over a bit time interval, the method of synchronizing the operations of the transmitter and receiver in transmitting and demodulating, respectively, the acoustic signal, comprising the steps of:
   a. producing first and second clock pulses defining the expected boundaries and midpoint of the bit time interval, respectively,
   b. sampling said acoustic signal from the expected midpoint of one bit time interval to the expected midpoint of the next succeeding bit time interval in response to said second clock pulses to produce a bit phase error signal having a first or second polarity dependent upon said second clock pulse occurring earlier or later, respectively, in time than the true midpoint of the bit time interval,
   c. detecting changes in the modulation state of the acoustic signal during the sampling period from the midpoint of one bit time interval to the midpoint of the next succeeding bit time interval, and
   d. phase shifting said first and second clock pulses earlier or later in time in accordance with the polarity of said bit phase error signal so as to be synchronized with the true boundaries and midpoint of the bit time interval, said phase shifting occurring only in response to the detection in step (c) of a modulation state change in the acoustic signal during the sampling period.

2. The method of claim 1 further including the steps of:
   a. determining the average signal amplitude of the acoustic signal over a plurality of bit time intervals, and
   b. dividing the bit phase error signal by said average signal amplitude to provide a normalized bit phase error signal which is independent of the amplitude of the acoustic signal, whereby said step of phase shifting said first and second clock pulses is carried out in response to said normalized bit phase error signal.

3. The method of claim 1 further including the steps of:
   a. determining the average bit phase error signal over a predetermined number of sampling periods during each of which there has been a phase state change in the acoustic signal, and
   b. phase shifting said first and second clock pulses in response to the polarity of said average bit phase error signal.

4. The method of claim 1 wherein said step of detecting phase state changes in the acoustic signal during the sampling period comprises the steps of:
   a. determining the average signal amplitude of the acoustic signal over a plurality of bit time intervals, and
   b. producing a valid bit phase error signal if the bit phase error signal is less than a predetermined amount of said average signal amplitude, and wherein said step of phase shifting said first and second clock pulses is initiated in response to said valid bit phase error signal.

5. The method of claim 4 wherein said step of phase shifting said first and second clock pulses is initiated only after a predetermined number of valid bit phase error signals have been produced.

6. The method of claim 1 wherein said step of detecting phase state changes in the acoustic signal during the sampling period comprises the steps of:
   a. determining the average signal amplitude of the acoustic signal over a plurality of bit time intervals,
   b. producing a signal indicative of the phase state of said acoustic signal over a bit time interval,
   c. determining the absolute value of said phase state indicative signal, and
   d. producing a valid bit phase error signal if the bit phase error signal is greater than a predetermined amount of said average signal amplitude and if the absolute value of said phase state indicative signal is less than a predetermined amount of said average signal amplitude, and wherein said step of phase shifting said first and second clock pulses is initiated in response to said valid bit phase error signal and the amount of said phase shifting is in proportion to the bit phase error signal.

7. The method of claim 6 wherein said step of phase shifting said first and second clock pulses is initiated only after a predetermined number of valid bit phase error signals have been produced.

8. A method of logging a well employing a drilling liquid and a drilling string within said well, comprising the steps of:
   a. transmitting an acoustic signal from a downhole location upward through the drilling liquid,
   b. modulating the state of said acoustic signal in response to a measured downhole condition, changes in said state representing bits of different characters, with each bit representation being transmitted over a predetermined number of acoustic signal cycles, said predetermined number of acoustic signal cycles defining a bit time interval,
   c. demodulating said acoustic signal at an uphole location to produce a bit value pulse of a first level when the state of said acoustic signal changes at the end of a bit time interval and of a second level when the state of said acoustic signal does not change at the end of a bit time interval, the bit value pulse thereby indicating the value of the transmitted bit over a bit time interval,
   d. producing a train of synchronizing pulses which occur at the frequency of the acoustic signal,
   e. counting said synchronizing pulses,
   f. producing a first clock pulse when the number of synchronizing pulses counted in step (e) equals the number of acoustic signal cycles in a bit time interval, the period of said first clock pulse being equal to one bit time interval,
   g. producing second and third clock pulses in response to said first clock pulse, said second clock pulse defining the boundaries of the bit time interval and the third clock pulse defining the midpoint of the bit time interval,
   h. sampling said acoustic signal from the midpoint of one bit time interval to the midpoint of the next succeeding bit time interval in response to said third clock pulses to provide a bit phase error signal if a phase state change has occurred in the acoustic signal during the sampling period, the bit phase error signal being of a first polarity if the third clock pulses are occurring earlier in time than the true midpoint of the bit time interval and of opposite polarity if the third clock pulses are occurring later in time than the true midpoint of the bit time interval,
   i. averaging the bit phase error signals over a plurality of sampling periods to obtain an average bit phase error signal, and
   j. injecting pulses into or deleting pulses from the train of said synchronizing pulses in response to the magnitude and polarity of said average bit phase error signal to cause said first clock pulse to be produced earlier or later in time, respectively, whereby the second and third clock pulses are consequently time shifted to be properly phased with the true boundaries and true midpoint, respectively, of the bit time interval.

9. The method of claim 8 wherein the step of averaging said bit phase error signals rejects the first bit phase error signal after the time shifting of said clock pulses.

10. In a system for logging while drilling including a downhole acoustic transmitter for transmitting upward through a drilling liquid inside a drill string an acoustic signal modulated between at least two phase states in response to a measured downhole condition and a lack of change in phase representing a bit of a different character, each bit representation being transmitted over a predetermined number of acoustic signal cycles which define a bit time interval; and an uphole receiver for demodulating the acoustic signal to produce a synchronously rectified signal representative of the phase state of the acoustic signal, the improvement comprising:
   a. means for producing a bit value pulse of a first state when the phase of said synchronously rectified signal changes at the end of a bit time interval and of a second state when the phase of said synchronously rectified signal does not change at the end of a bit time interval, the bit value pulse thereby indicating the value of the transmitted bit over a bit time interval,
   b. means for producing a train of synchronizing pulses at the frequency of the acoustic signal,
   c. a counter for counting said synchronizing pulses,
   d. a generator for producing first and second clock pulses when the number of synchronizing pulses counted equals the number of acoustic signal cycles in a bit time interval, said first and second clock pulses defining, respectively, the expected time occurrence of the boundaries and midpoint of the bit time interval,
   e. a first integrator responsive to said second clock pulse for integrating said synchronously rectified signal from the midpoint of one bit time interval to the midpoint of the next succeeding bit time interval, the output of said first integrator being a bit phase error signal of a first or second polarity if said second clock pulses are occurring earlier or later, respectively, in time than the true midpoint of the bit time interval, and
   f. means for deleting pulses from or injecting additional pulses into said train of synchronizing pulses in response to the magnitude and polarity of said bit phase error signal to cause the output of said counter to reach a number equal to the number of acoustic signal cycles in a bit time interval later or earlier in time, respectively, whereby said generator produces said first and second clock pulses later or earlier in time so as to properly phase said first and second clock pulses with the true boundaries and true midpoint, respectively, of the bit time interval.

11. The system of claim 10 further including:
a. a first absolute value detector to which said synchronously rectified signal is applied, said absolute value detector providing a full-wave, positive, rectified signal,
b. a low-pass filter to which said full-wave, positive, rectified signal is applied, the output of said filter being representative of the average signal amplitude of the synchronously rectified signal, and
c. means for providing a normalized bit phase error by dividing said bit phase error signal by said average signal amplitude.

12. The system of claim 11 further including:
a. a second integrator for integrating said normalized bit phase error over a plurality of bit time intervals, the output of said second integrator being an average bit phase error signal which is positive if the bit clock pulses are occurring too early in time and is negative if the bit clock pulses are occurring too late in time,
b. means for ramping said average bit phase error signal to zero and for producing a shift interval pulse for the time duration of said ramping,
c. means for permitting the deletion of synchronizing pulses during the period of said shift interval pulse when said average bit phase error signal is positive and for permitting the addition of synchronizing pulses during the period of said shift interval pulse when said average bit phase error signal is negative whereby said first and second clock pulses are phase shifted to be correctly synchronized with the true boundaries and midpoint of the bit time interval in response to the sign and magnitude of the bit phase error signal.

13. The system of claim 12 further including:
a. means coupled to said low-pass filter for producing a valid bit phase error signal in response to a phase change in said synchronously rectified signal during the integration period of said integrator, and
b. means for inhibiting the phase shifting of said first and second clock pulses until a predetermined number of valid bit phase error signals have been produced.

14. The system of claim 13 further including: means responsive to each phase shift of said first and second clock pulses for inhibiting said polarity change detector until after the occurrence of the first bit phase error signal following a phase shift.

* * * * *

UNITED STATES PATENT AND TRADEMARK OFFICE
CERTIFICATE OF CORRECTION

PATENT NO. : 4,001,775
DATED : January 4, 1977
INVENTOR(S) : James H. Sexton, Bobbie J. Patton and John W. Harrell It is certified that error appears in the above-identified patent and that said Letters Patent are hereby corrected as shown below:

Column 5, line 58, "not" should be --now--.
Column 6, line 25, "outputs" should be --output--.
Column 7, line 3, " "1" value " should be --"1" bit value--.
Column 9, line 33, "output of ℓℓ of" should be --output ℓℓ of--.
         line 35, "shifter" should be --shift--.
Column 11, line 23, "provides "0" bb" should be
         --provides a "0" bb--.
Column 13, line 13, "Be" should be --By--.
Column 15, line 3, "shaft" should be --shift--.
Column 18, line 23, after "condition" and before "and" the
following should be inserted --with a change
in phase representing a bit of one
character--.

Signed and Sealed this

Twelfth Day of April 1977

[SEAL]

Attest:

RUTH C. MASON
Attesting Officer

C. MARSHALL DANN
Commissioner of Patents and Trademarks